(12) United States Patent
Kleyer et al.

(10) Patent No.: US 7,809,995 B2
(45) Date of Patent: Oct. 5, 2010

(54) METHOD AND DEVICE FOR MONITORING THE FUNCTIONALITY OF AN AUTOMATION SYSTEM OF A PLANT

(75) Inventors: Dieter Kleyer, Herzogenaurach (DE); Wolfgang Ott, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 241 days.

(21) Appl. No.: 11/793,512

(22) PCT Filed: Dec. 16, 2005

(86) PCT No.: PCT/EP2005/056874

§ 371 (c)(1),
(2), (4) Date: Apr. 25, 2008

(87) PCT Pub. No.: WO2006/069926

PCT Pub. Date: Jul. 6, 2006

(65) Prior Publication Data

US 2009/0100292 A1    Apr. 16, 2009

(30) Foreign Application Priority Data

Dec. 23, 2004  (EP) .................................. 04030640

(51) Int. Cl.
*G06F 11/00* (2006.01)
(52) U.S. Cl. ............................. 714/55; 714/13; 714/35; 714/38; 714/47; 700/82

(58) Field of Classification Search .................. 714/13, 714/55, 35, 38, 47; 700/82
See application file for complete search history.

(56) References Cited

U.S. PATENT DOCUMENTS

| 4,628,508 A * | 12/1986 | Sager et al. ..................... 714/13 |
| 5,636,124 A | 6/1997 | Rischar et al. |
| 5,844,795 A * | 12/1998 | Johnston et al. ............... 700/83 |
| 6,026,236 A * | 2/2000 | Fortin et al. .................. 717/127 |
| 6,708,286 B2 * | 3/2004 | Alexander et al. ............ 714/11 |
| 6,931,568 B2 * | 8/2005 | Abbondanzio et al. ........ 714/11 |

FOREIGN PATENT DOCUMENTS

| DE | 199 21 247 A1 | 11/2000 |
| DE | 100 49 440 A1 | 4/2002 |

\* cited by examiner

*Primary Examiner*—Robert Beausoliel
*Assistant Examiner*—Charles Ehne

(57) ABSTRACT

There is described a method for monitoring the functionality of an automation system of a plant comprising at least one main processor, parts of the plant being monitored and controlled using a user software, which is constructed of a number of program modules and which is run on the main processor. A co-processor is assigned to the main processor, and a message is transmitted from the main processor to the co-processor. When received, this message is used by the co-processor to start a monitoring time. When a subsequent message is received, this monitoring time is reset before said monitoring time has elapsed, otherwise a fault is identified once the monitoring time has elapsed.

13 Claims, 1 Drawing Sheet

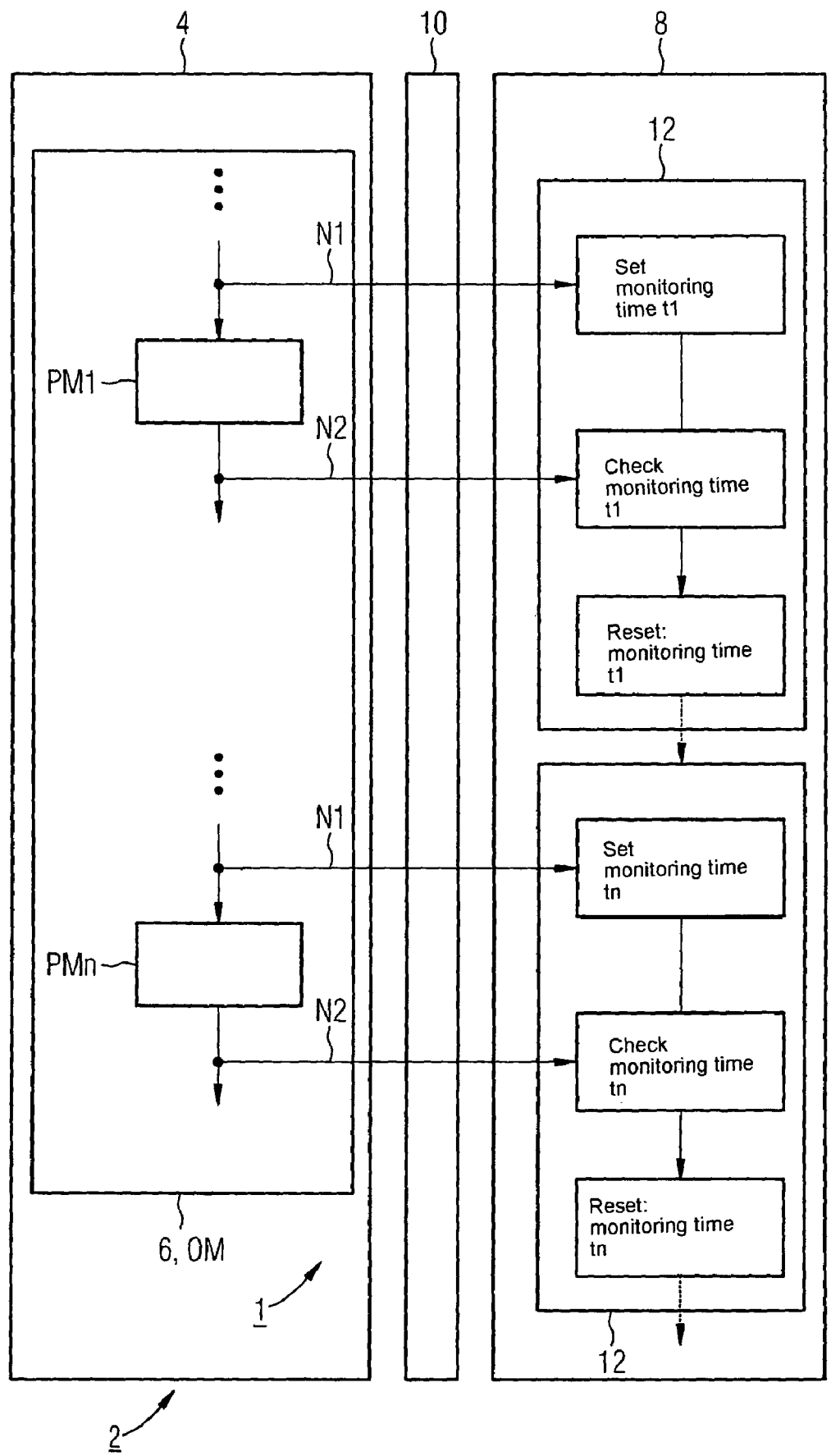

METHOD AND DEVICE FOR MONITORING THE FUNCTIONALITY OF AN AUTOMATION SYSTEM OF A PLANT

CROSS REFERENCE TO RELATED APPLICATIONS

This application is the US National Stage of International Application No. PCT/EP2005/056874, filed Dec. 16, 2005 and claims the benefit thereof. The International Application claims the benefits of European application No. 04030640.9 EP filed Dec. 23, 2004, both of the applications are incorporated by reference herein in their entirety.

FIELD OF INVENTION

The invention relates to a method and to a device for monitoring and checking the functionality of an automation system of a plant, in particular a power plant, comprising a main processor.

BACKGROUND OF THE INVENTION

Conventional personal computers (also called PC-based automation systems) are increasingly being used in the automation of power plants instead of conventional stored program control (called SPC for short). The conventional stored program control has fixed wiring irrespective of the respective control task which is adapted by a program to the plant to be controlled. In contrast hereto there exist as an alternative stored program control hardwired program controls which, however, have to be converted in terms of hardware in the event of a change to the control sequence.

Modern PC-based automation systems comprise automation devices, constructed as personal computers, with basic software. PC-based automation systems of this kind are becoming increasingly more important owing to the simple creation of system and user software based on modern programming languages. The basic software generally comprises a real-time operating system and specific programming modules (also called "modular units") which simulate automation functions such as open-loop control, closed-loop control, AND/OR functions, adders and other logic elements. A communication program to allow a plurality of automation devices to communicate with each other and/or with external data processing units, such as with a programming device, is conventionally also provided. A PC-based automation device operates like a conventional stored program control according to what is known as the IPO principle (IPO=input, processing, output).

The drawback of a PC-based automation system lies in inadequate availability. While SPC-based automation systems allow, for example, smooth changeover in the millisecond range, according to predefinable availability requirements, with a PC-based automation system this lies in the second range owing to monitoring by means of what is known as a watchdog function. Recognition of a fault and a resulting changeover from a faulty automation device to a faultless automation device is subject to predefined safety requirements and the reliability of the automation system for process management and process monitoring of the plant. In order to also be able to use a PC-based automation system for safety-relevant systems in a power plant, fast and reliable fault recognition and, resulting therefrom, an optimally smooth changeover are required during operation.

SUMMARY OF INVENTION

An object underlying the invention therefore is to disclose a method and a device for monitoring the functionality of an, in particular, PC-based automation system which allows fast and reliable fault monitoring and recognition.

With respect to the method the object is achieved according to the invention by the features of independent claim. With reference to the device the object is achieved according to the invention by the features of a further independent claim.

Advantageous developments of the invention are the subject matter of the subclaims.

According to the invention, in a method for monitoring the functionality of an automation system of a plant comprising at least one main processor, parts of the plant are monitored and controlled using a user software which is constructed from a number of program modules and which is run on the main processor, a co-processor being assigned to the main processor and a message being transmitted from the main processor to the co-processor, when received the message being used by the co-processor to start a monitoring time, when a subsequent message is received the monitoring time being reset, otherwise a fault is identified once the monitoring time has elapsed.

The invention takes as its starting point the consideration that for particularly simple and fast monitoring and recognition of faults, for example of software and/or hardware faults in the main processor, these processes should be carried out separately and independently of the cycle time of the main processor. For this purpose use of a co-processor is provided which, when a conventional standard PC is used as the automation device in a highly available automation system, increases the availability of the standard PC by identifying faults quickly and reliably.

For recognizing faults in the millisecond range the message for fault monitoring and recognition is expediently sent to the co-processor when one of the main processor program modules is invoked. In addition or alternatively the message can be sent to the co-processor once one of the program modules has elapsed. Error recognition and monitoring thus take place in a module-based manner independently of the total processing time or total cycle time of the main processor. The PC-based automation system is based on functional modular units which fulfill automation sub-functions or functions in the form of software modules or sub-programs. These modular units are in turn invoked by higher-order organizational or program modular units. These modular units or program modules, for example the functional modular units, the organizational modular units, the program modular units, are constructed from a run-time environment, for example a run-time container or an automation function which in turn are started by the operating system or function administration (also called task administration or task manager). Monitoring the individual program modules by means of messages sent to the co-processor when invoked or once the respective program module has elapsed ensures that individual program modules are checked and analyzed for both software and hardware faults.

Alternatively or in addition to module-based fault monitoring and recognition the message may also be cyclically sent to the co-processor, for example at discrete intervals. This also allows monitoring of a group of program modules using the total processing time thereof. For this purpose the monitoring time is expediently adjusted so as to correspond with the total processing time.

In a further embodiment at least one limiting value is predefined for the monitoring time. This allows for example monitoring of limit ranges for the processing time of individual or a plurality of program modules. If for example a run time is below a plausible limiting value, and thus within the predefined admissible limits, faultless processing of the relevant program module(s) is assumed. If for example a first predefined limit is exceeded and a second predefined limit is fallen below, a corresponding fault analysis, for example of a hardware fault, such as a storage fault, can be carried out on the basis of the range. Further criteria and/or conditions can moreover be predefined for monitoring and recognition of faults and can be considered when checking the monitoring time and analysis thereof.

Alternatively or in addition at least one fault analysis program may be activated once the monitoring time has elapsed and thus when identifying a fault. Basically a fault which leads to a time overrun can be caused by a hardware fault (for example a CPU fault) or by a software fault (for example endless loop in processing of a program module). By way of example an analysis program for checking the main processor, for checking the memory, for checking the data transmission unit, for checking an interface and/or for checking hardware inputs and/or outputs can be started as a fault analysis program for accurate and reliable fault recognition. Individual faulty components or program modules can thus be identified and exchanged or deactivated. The fault analysis can also take place in stages depending on the default settings. For example the automation system can be checked in a first analysis for hardware faults and in the absence of a hardware fault be checked for a software fault or vice versa.

In a further embodiment the co-processor is preferably monitored by means of the main processor using a watchdog signal which checks the availability of the co-processor. The interface between co-processor and main processor is preferably also monitored by monitoring of the co-processor.

The device for monitoring the functionality of the automation system comprising at least one main processor, parts of the plant being monitored and controlled using a user software which is constructed from a number of program modules and which is run on the main processor, comprises the main processor which is connected to a co-processor via an interface. A message can be transmitted from the main processor to the co-processor via the interface, when received the message being used by the co-processor to start a monitoring time, when a subsequent message is received the monitoring time being reset, otherwise a fault is identified once the monitoring time has elapsed. The interface is preferably constructed as a PCI interface (PCI=Peripheral Component Interconnect), an AGP interface (AGP=Accelerated Graphics Port) or a LAN interface (LAN=Local Area Network). The PCI interface is a bus standard for connecting peripherals to the main processor. The AGP interface is a high-speed bus system with which computer components are connected to the main processor (=mainboard) of the personal computer. To check the elapse of the monitoring time the co-processor preferably comprises a time module.

The advantages achieved with the invention consist in particular in that use of a separate co-processor as the monitoring processor for a PC-based automation system allows simple and inexpensive fault recognition and fault analysis that meets safety and availability requirements. This ensures that when identifying a fault in the millisecond range there is a sufficiently fast changeover from the main processor to a back-up processor. This in turn leads to particularly high availability of the PC-based automation system. Multi-stage fault recognition and fault analysis is also possible. In addition the automation system, as a PC development, can be based on any desired operating system. In particular, use of a PC-based automation system means that user software adapted to the operating system can be used, whereby sporadic software faults are avoided.

BRIEF DESCRIPTION OF THE DRAWING

Exemplary embodiments of the invention will be described in more detail with reference to a sole drawing. In the drawing the FIGURE shows a device 1 for monitoring the functionality of an automation system 2.

DETAILED DESCRIPTION OF INVENTION

The automation system 2 is used to control and/or regulate and monitor a plant, not shown in detail, for example a power plant. An automation system 2 is taken to mean a process-control device or a data processing unit which is based on a conventional personal computer and fulfils tasks and functions of a conventional storage program control. A PC-based automation system 2 of this type comprises one or more PC-based automation device(s) which are used to control and/or regulate the plant process. Only one automation device is shown in the exemplary embodiment. Depending on the size and complexity of the plant a plurality of automation devices can be connected via a data transmission unit (not shown).

The automation system 2, in particular the respective automation device, comprises a main processor 4 on which user software 6 for controlling and regulating the plant process is run. The user software 6 comprises a plurality of program modules PM1 to PMn (also called functional modular units) which are invoked by a higher-order program module OM (also called an organizational modular unit) for processing open-loop control and/or closed-loop control functions of the plant process.

For monitoring the functionality of the main processor 4 the main processor is connected to an associated co-processor 8 via an interface 10. The interface 10 is constructed as a PCI interface, an AGP interface or a LAN interface. The co-processor 8 is a conventional external processor unit. The main processor 2 is a conventional CPU (=Central Processing Unit) of a personal computer.

As a result of high safety and availability requirements in plant, such as a power plant, during operation the plant is to be checked for faults in order to be able to activate a back-up system as quickly as possible, and within the millisecond range, in the case of safety-relevant functions. In other words: hardware or device faults and software faults are not allowed to influence control of the plant process. For this purpose faults must be identified and analyzed as soon as they occur.

During operation of the automation system 2 a message N1 is transmitted to the co-processor 10 when one of the program modules PM1 to PMn is invoked and/or transmitted cyclically in predefined discrete intervals for fast fault recognition and analysis. The invoked program module PM1 to PMn may be clearly identified with the aid of an identifier.

The co-processor 10 receives this message N1 and when the message N1, for example an invoke message for the relevant program modules PM1 to PMn, is received starts a monitoring time t1 to tn by activating a time module 12.

Once the relevant program modules PM1 to PMn has elapsed and been left a further message N2 about the elapse of the program module PM1 to PMn is sent from the main processor 4 to the co-processor 10 which stops and optionally resets the started monitoring time t1 to tn.

When the message N2 is received within the monitoring time t1 to tn or within predefined limits for the monitoring time t1 to tn, the time is reset and faultless operation is identified.

For the case where the message N2 is received once the monitoring time t1 to tn has elapsed or is not received at all, a fault is identified by the co-processor 10 since the processing time of the relevant program module PM1 to PMn is exceeded. The monitoring time t1 to tn is not reset in this case but used for fault analysis. In addition the stand-by personal computer is activated. The main processor 4 operating as a master personal computer and identified as having a fault is deactivated.

In addition a control signal S for changing-over from main processor 4 to a back-up or standby processor is automatically generated on identification of a fault. Alternatively or in addition an alarm signal can be generated and output. A further control signal S for activating a fault analysis program can also be generated. Accurate analysis of hardware faults, for example storage faults, or of software faults can be carried during out a subsequent fault analysis by predefining limiting ranges for the respective monitoring time t1 to tn.

By using the co-processor 8 as a monitoring processor only the main processor 4 that belongs to the co-processor in each case is monitored for faults, for example software and/or hardware faults. CPU faults, storage faults, bus faults and interface faults can be monitored and identified by means of the activated fault analysis program in the process. The functionality of all components of the main processor 4 and the components of a personal computer connected thereto can be checked and monitored by means of the respective fault analysis process. Faulty components can be identified and then replaced or deactivated.

Fault analysis preferably takes place in multiple stages, in particular in two stages. The hardware of the automation system 2 is checked and analyzed in a first stage. If no fault is identified despite elapse of the monitoring time t1 to tn, the software, i.e. the relevant program modules PM1 to PMn are subsequently checked and tested.

In addition the interface 10 and the main processor 4 can moreover be checked by conventional monitoring methods, for example watchdog methods.

The invention claimed is:

1. A method for monitoring an automation system with a main processor to control a technical installation, comprising:
    monitoring and controlling parts of the technical installation based upon a user software, wherein the user software has a plurality of program modules executed on the main processor, wherein a co-processor is assigned to the main processor;
    upon invoking of a program module of the plurality of program modules on the main processor, transmitting an invoke message for the invoked program module from the main processor to the co-processor;
    starting a corresponding monitoring time for the invoked program module on the co-processor when the invoke message is received by the co-processor, the corresponding monitoring time used to monitor a processing time of the invoked program module;
    wherein, if a further message indicating an elapse of the invoked program module is received by the co-processor from the main processor within a predetermined time limit, the corresponding monitoring time is reset thereby indicating a faultless operation of the invoked program module;
    otherwise, identifying a fault upon receipt of the further message indicating the elapse of the invoked program module after the corresponding monitoring time elapses or when the further message indicating the elapse of the invoked program module is not received at all, thereby indicating the processing time has exceeded the predetermined time limit to allow for further fault analysis.

2. The method as claimed in claim 1, wherein the main processor is deactivated upon identification of the fault and a control signal is sent to a standby processor for a change-over.

3. The method as claimed in claim 1, wherein the corresponding monitoring time is not reset upon identification of the fault and is used for fault analysis.

4. The method as claimed in claim 1, wherein at least one error analysis program is activated upon identification of the fault.

5. The method as claimed in claim 1, wherein a multi-stage error analysis is activated upon identification of the fault comprising a hardware analysis as a first stage and a program module analysis as a second stage.

6. The method as claimed in claim 1, wherein the co-processor is monitored by the main processor based upon a watchdog signal.

7. The method as claimed in claim 1, wherein the technical installation is a plant.

8. A device for monitoring a functionality of an automation system of a plant, comprising:
    at least one main processor;
    a user software to monitor and control parts of the plant, wherein the user software has a plurality of program modules executed on the main processor; and
    a co-processor connected to the main processor via an interface to send a message from the main processor to the co-processor, wherein
    the main processor is adapted to transmit an invoke message to the co-processor upon invoking of a program module of the plurality of program modules on the main processor; and wherein
    the co-processor is adapted to start a corresponding monitoring time for the invoked program module on the co-processor when the invoke message is received, the corresponding monitoring time used to monitor a processing time of the invoked program module;
    wherein, if a further message indicating an elapse of the invoked program module is received by the co-processor from the main processor within a predetermined time limit, the corresponding monitoring time is reset thereby indicating a faultless operation of the invoked program module; otherwise, a fault is identified upon receipt of the further message indicating the elapse of the invoked program module after the corresponding monitoring time elapses or when the further message indicating the elapse of the invoked program module is not received at all, thereby indicating the processing time has exceeded the predetermined time limit to allow for further fault analysis.

9. The device as claimed in claim 8, wherein the interface is selected from the group consisting of a PCI interface, an AGP interface and a LAN interface.

10. The device as claimed in claim 8, wherein the co-processor comprises a time module.

11. A PC-based automation system, comprising:
    at main processor;
    a real-time operating system;

a user software with a plurality of program modules executed on the main processor;

a co-processor connected to the main processor via an interface selected from the group consisting of a PCI interface and an AGP interface, wherein the co-processor has a time module;

a back-up processor for a changeover from the main processor to the back-up processor when a fault is detected based upon the co-processor operated as a monitoring processor, wherein the main processor and co-processor are adapted to monitor for faults by:

upon invoking of a program module of the plurality of program modules on the main processor, transmitting an invoke message for the invoked program module from the main processor to the co-processor;

starting a corresponding monitoring time for the invoked program module on the co-processor when the invoke message is received by the co-processor, the corresponding monitoring time used to monitor a processing time of the invoked program module;

wherein, if a further message indicating an elapse of the invoked program module is received by the co-processor from the main processor within a predetermined time limit, the corresponding monitoring time is reset thereby indicating a faultless operation of the invoked program module;

otherwise, identifying the fault upon receipt of the further message indicating the elapse of the invoked program module after the corresponding monitoring time elapses or when the further message indicating the elapse of the invoked program module is not received at all, thereby indicating the processing time has exceeded the predetermined time limit to allow for further fault analysis.

12. The method as claimed in claim 11, wherein the corresponding monitoring time is not reset upon identification of the fault and is used for fault analysis.

13. The method as claimed in claim 12, wherein the co-processor is monitored by the main processor based upon a watchdog signal.

* * * * *